United States Patent
Shigemori et al.

(10) Patent No.: US 8,378,053 B2
(45) Date of Patent: Feb. 19, 2013

(54) ALIPHATIC POLYISOCYANATE PREPOLYMERS AND POLYURETHANE RESIN COATING COMPOSITIONS USING THE SAME

(75) Inventors: Tomokazu Shigemori, Osaka-Fu (JP); Kouichi Katamura, Kobe (JP); Hisafumi Tabana, Osaka-Fu (JP)

(73) Assignee: Bayer MaterialScience AG, Leverkusen (DE)

( * ) Notice: Subject to any disclaimer, the term of this patent is extended or adjusted under 35 U.S.C. 154(b) by 186 days.

(21) Appl. No.: 11/974,834

(22) Filed: Oct. 16, 2007

(65) Prior Publication Data

US 2008/0114144 A1      May 15, 2008

(30) Foreign Application Priority Data

Oct. 18, 2006   (JP) ................................. 2006-283976

(51) Int. Cl.
*C08G 18/32* (2006.01)
*C08G 18/10* (2006.01)
*C08G 18/40* (2006.01)
*C08G 18/79* (2006.01)

(52) U.S. Cl. ................ 528/65; 528/66; 528/73

(58) Field of Classification Search ............... 252/182.2, 252/182.21, 182.22; 528/65, 66, 73; 544/222; 560/158
See application file for complete search history.

(56) References Cited

U.S. PATENT DOCUMENTS

| 3,583,943 | A | * | 6/1971 | Weber et al. ..................... 528/45 |
| 5,502,149 | A | * | 3/1996 | Yoshida et al. ................. 528/60 |
| 6,080,812 | A |  | 6/2000 | Morishima et al. |
| 2004/0143083 | A1 | * | 7/2004 | Gurtler et al. ................... 528/44 |
| 2007/0117955 | A1 | * | 5/2007 | Tye et al. ......................... 528/95 |

FOREIGN PATENT DOCUMENTS

| DE | 19729243 A1 |   | 1/1999 |
| GB | 2308125 A   |   | 6/1997 |
| JP | 64-54077    | * | 3/1989 |
| JP | 6-287512    | * | 10/1994 |
| JP | 2003128989  |   | 5/2003 |
| JP | 2004-230749 | * | 8/2004 |
| JP | 2004230749 A |  | 8/2004 |
| JP | 2005-154674 | * | 6/2005 |
| JP | 2005154674 A |  | 6/2005 |
| JP | 2005171000  |   | 6/2005 |

* cited by examiner

*Primary Examiner* — Rabon Sergent
(74) *Attorney, Agent, or Firm* — Novak Druce Connolly Bove + Quigg LLP

(57) ABSTRACT

An aliphatic polyisocyanate prepolymer obtained by reacting an aliphatic isocyanurate group-containing polyisocyanate with a short-chain diol, having a urethane bond content of 3.0% by weight or more based on the weight of the prepolymer and a solubility parameter of 11.8 or more.

20 Claims, No Drawings

ALIPHATIC POLYISOCYANATE PREPOLYMERS AND POLYURETHANE RESIN COATING COMPOSITIONS USING THE SAME

CROSS-REFERENCE TO RELATED APPLICATION

This application Claims priority under 35 U.S.C. §119(a-d) to Japanese Application 2006-283976, filed Oct. 18, 2006.

TECHNICAL FIELD

The present invention relates to polyurethane resins, particularly, aliphatic polyisocyanate prepolymers useful as hardeners for coatings, inks and adhesives. In particular, the present invention relates to aliphatic polyisocyanate prepolymers excellent in both hardening property and compatibility with a hydroxyl group-containing polyols having a hydroxyl group content of 5.0% by weight or more in resin, and also relates to a polyurethane resin coating composition using the same.

BACKGROUND OF THE INVENTION

Generally, two-component polyurethane resin coatings comprise a polyisocyanate prepolymer composition as a hardener and a polyol composition as a base resin and have a very high wear resistance, chemical resistance, stain resistance and flexibility.

Conventionally, aliphatic polyisocyanates obtained from aliphatic diisocyanates have been used in polyisocyanate prepolymer compositions as hardeners, and acrylic polyol, polyester polyol, fluoropolyol, etc. have been widely used as polyol compositions.

A polyurethane resin coating using aliphatic polyisocyanate prepolymers is especially excellent in weather resistance, and thus, a demand therefor grows larger in the fields of automobiles, plastics, and exterior materials for constructions.

When a two-component polyurethane resin coating is formulated by using aliphatic polyisocyanate prepolymers as a hardener and a hydroxyl group-containing polyol as a base resin, the coating layer formed contains many urethane bonds and has improved in weather resistance, wear resistance, chemical resistance, solvent resistance, stain resistance, water resistance, heat stability, etc. and better coating characteristics. Because of these characteristics, it is considered that this two-component type polyurethane resin coating will come into wide use in the fields where excellent properties of coating layers are necessary, for example, coating or repair of automobile bodies and a variety of plastics.

Aliphatic polyisocyanates obtained from aliphatic diisocyanate include biuret polyisocyanates, adduct polyisocyanates, and isocyanurate group-containing polyisocyanates. Among these, isocyanurate group-containing polyisocyanates provide superior weather resistance, wear resistance, chemical resistance, stain resistance, flexibility and heat stability than other aliphatic polyisocyanates.

However, isocyanurate group-containing polyisocyanates lack compatibility with the hydroxyl group-containing polyol compositions, and therefore do not provide coating layers having stable properties. Under such a circumstance, there is a demand for development of aliphatic polyisocyanate prepolymers comprising an isocyanurate group-containing polyisocyanate having improved compatibility with hydroxyl group-containing polyols.

SUMMARY OF THE INVENTION

An object of the present invention is to provide aliphatic polyisocyanate prepolymers having excellent compatibility with hydroxyl group-containing polyols and a polyurethane resin coating composition which has stable and good coating characteristics resulting from use of the aliphatic polyisocyanate prepolymers.

Accordingly, the above-mentioned problems can be solved by aliphatic polyisocyanate prepolymers obtained by reacting a short-chain diol with an isocyanurate group-containing polyisocyanate obtained from an aliphatic diisocyanate, having a urethane bond content of 3% by weight or more based on the weight of the aliphatic polyisocyanate prepolymers and having a solubility parameter of 11.8 or more.

The present invention provides aliphatic polyisocyanate prepolymers obtained by reacting a short-chain diol with an aliphatic isocyanurate group-containing polyisocyanate derived from an aliphatic diisocyanate (particularly 1,6-hexamethylene diisocyanate). The content of urethane bonds in the prepolymers is 3% by weight or more based on the weight of the prepolymers, and the solubility parameter of the prepolymers is 11.8 or more.

The present invention further provides a polyurethane coating composition comprising the above-mentioned aliphatic polyisocyanate prepolymers and a polyol having a hydroxyl group content of 5.0% by weight or more, based on the weight of the polyol.

When the aliphatic polyisocyanate prepolymers of the present invention are used as a hardener in a two-component polyurethane resin coating, compatibility with a hydroxyl group-containing polyol is improved, so that a coating capable of providing stable and good characteristics is provided.

DETAILED DESCRIPTION OF THE INVENTION

Hereinafter, the present invention will be described in more detail.

As used herein in the specification and Claims, including as used in the examples and unless otherwise expressly specified, all numbers may be read as if prefaced by the word "about", even if the term does not expressly appear. Also, any numerical range recited herein is intended to include all subranges subsumed therein.

Preferably, the aliphatic diisocyanate used in the present invention has 4 to 30 carbon atoms. Examples of the aliphatic diisocyanate include tetramethylene diisocyanate, 1,5-pentamethylene diisocyanate, 1,6-hexamethylene diisocyanate (hereinafter referred to as "HDI"), 2,2,4- (or 2,4,4-) trimethyl-1,6-hexamethylene diisocyanate, lysine isocyanate, isophorone diisocyanate, hydrogenated xylene diisocyanate, hydrogenated diphenylmethane diisocyanate, 1,4-diisocyanatocyclohexane, 1,3-bis(diisocyanatomethyl)cyclohexane, and 4,4'-dicyclohexylmethane diisocyanate. Among them, HDI is preferred in view of weather resistance and commercial availability. Although each of the above-mentioned aliphatic diisocyanates may be used alone or in combination, it is preferably used alone.

Among aliphatic polyisocyanates obtained from these aliphatic diisocyanates, allophanates biurets, amide group-containing polyisocyanates and TMP (trimethylolpropane) adducts are not inferior to isocyanurate group-containing polyisocyanates in compatibility with a polyol having a high hydroxyl group content, but are inferior thereto in coating characteristics.

Therefore, it is preferable that the aliphatic polyisocyanate prepolymers obtained from the aliphatic diisocyanate do not contain, for example, allophanate bonds, biuret bonds, or amide bonds, and thus, the single use of the aliphatic isocyanurate group-containing polyisocyanate is preferred.

Also, the aliphatic polyisocyanate prepolymers of the present invention preferably do not contain any modified group (or a bond containing a nitrogen atom) other than the isocyanurate bond and the urethane bond, so that a coating layer formed from the aliphatic polyisocyanate prepolymers and a hydroxyl group-containing polyol is excellent in weather resistance and heat resistance.

A short-chain diol is used in the urethanization reaction (urethane modification of the aliphatic isocyanurate group-containing polyisocyanate).

The diol may be of straight chain, branched chain or cyclic chain, and is preferably a compound consisting of a carbon atom, hydrogen atom and oxygen atom. Particularly preferred is a $C_2$-$C_7$ diol.

Examples of suitable diols include ethylene glycol, propylene glycol, 1,2-propanediol, 1,3-propanediol, 1,4-butanediol, 1,3-butanediol, 1,2-butanediol, 1,5-pentanediol, 1,6-hexanediol, methylpentanediol, methylpentanediol, diethylene glycol, propylene glycol and triethylene glycol.

Each of these diols may be used alone or in combination.

The molecular weight (MW) of the diol is preferably 100 or less. A preferred diol has 2 to 4 carbon atoms, particularly 3 or 4 carbon atoms, and has a molecular weight of 62 to 90. The solubility parameter (SP) of the diol is preferably 14.8 or more, for example, from 14.8 to 17.8.

A diol having 8 or more carbon atoms, in itself, has a lower SP value, and therefore, the use of such a diol makes it impossible to satisfy the condition that the SP value of the aliphatic isocyanurate group-containing polyisocyanate obtained from the aliphatic diisocyanate, after the urethane modification, is 11.8 or more (the isocyanate group content in the prepolymer: 16.5% by weight). Therefore, the compatibility with the hydroxyl group-containing polyol becomes poor.

It is recommended that the urethane modification not be carried out before or simultaneously with the formation of the isocyanurate, since the polyisocyanurate is reacted with the diol.

The process for preparing the aliphatic polyisocyanate prepolymer can be conducted independently of the presence or absence of a solvent. When a solvent is used, it is necessary to select a solvent inactive with an isocyanate group.

In the urethane modification, for example, an organic salt of metal (e.g., tin, zinc, lead and phosphorus), metal alcoholate (e.g., sodium methylate, sodium ethylate, sodium phenolate, and potassium methylate) and tertiary amine may be used as a catalyst.

The urethane modification may be carried out generally at a temperature of −20 to 150° C., preferably at a temperature of 0 to 100° C. Disadvantageously, the urethane modification at higher than 150° C. is likely to cause a side reaction, while the urethane modification at lower than −20° C. is remarkably retarded in reaction rate. In addition, it is preferred that the reaction of the aliphatic polyisocyanate with the short-chain diol is allowed to proceed little by little, because of the low compatibility with the short-chain diol, and it is preferable to form a urethane bond from the isocyanate group and the hydroxyl group without any side reaction.

Preferably, the content of the urethane bond formed by the reaction of the aliphatic isocyanurate group-containing polyisocyanate with the short-chain diol is be 3.0% by weight or more, preferably 4.0% by weight or more, more preferably 4.5% by weight or more, based on the weight of the aliphatic polyisocyanate prepolymer. When the urethane bond content is less than 3.0% by weight, sufficient compatibility with the hydroxyl group-containing polyol cannot be obtained. The isocyanate content is preferably 10% by weight or more, particularly 16.5% by weight or more. The upper limit of the isocyanate group content is generally 25% by weight, based on the weight of the prepolymer.

The urethanization reaction of the isocyanurate group-containing polyisocyanate with the short chain diol is preferably carried out in the presence of a solvent.

Suitable solvents include hydrocarbons such as cyclohexane, mineral sprit, and naphtha; ketones such as acetone, methyl ethyl ketone and methyl isobutyl ketone; and esters such as ethyl acetate, n-butyl acetate, isobutyl acetate, cellosolve acetate, and propylene glycol monomethylether acetate, in accordance with an end use. Each of these solvents may be used alone or in combination with at least one selected from the above. Preferably, the solvent component is an ester such as ethyl acetate, n-butyl acetate, isobutyl acetate, cellosolve acetate, and propylene glycol monomethylether acetate, or a ketone such as methyl ethyl ketone, and methyl isobutyl ketone. The use of an aromatic hydrocarbon such as toluene and xylene as the solvent is undesirable, in view of environmental problems such as sick building syndrome. The amount of the solvent may be 40 to 99.5% by weight, for example, more preferably 60 to 90% by weight, based on the weight of the aliphatic polyisocyanate prepolymer.

The urethane bond content in the aliphatic polyisocyanate prepolymer of the present invention can be calculated by the following equation:

Urethane bond content(%)=(X)×59/(total of the weight(g) of aliphatic polyisocyanate and the weight(g) of diol before modification)×100 wherein (X) is the number of moles of the hydroxyl group in the diol reacted with the aliphatic isocyanurate group-containing polyisocyanate.

Each of the SP values of various polyisocyanate compounds, various isocyanates obtained from the polyisocyanate compounds or polyisocyanates obtained from aliphatic diisocyanates, and the aliphatic polyisocyanate prepolymer used in the present invention (i.e., the urethane bond-containing polyisocyanate) is calculated by the following calculation method advocated by Fedors:

$$\delta=[\Sigma(\Delta E1)/\Sigma(\Delta V1)]^{1/2}$$

wherein $\Delta E1$ is a cohesive energy per unit functional group, and $\Delta V1$ is a molecular volume per unit functional group.

According to this calculation method, the SP value becomes smaller in the order of aromatic compounds, aliphatic compounds and alicyclic compounds in the group of polyisocyanate compounds. Further, the SP value becomes smaller in the order of allophanate, biuret, TMP adduct and isocyanurate polyisocyanates obtained from the polyisocyanate compounds.

The SP value of polyisocyanate obtained from aliphatic diisocyanate (particularly HDI) is 11.7 for HDI uretodione as a dimer, 12.0 for HDI biuret or HDI-TMP adduct as a trimer, 11.7 for HDI isocyanurate as a trimer, 10.9 for IPDI isocyanurate as a trimer, and 13.8 for TDI (tolylenediisocyanate) isocyanurate as a trimer.

When the SP value of polyisocyanate obtained from aliphatic diisocyanate is 11.7 or less, generally, a sufficient result can not be obtained, because the compatibility with the hydroxyl group-containing polyol is considered to be low.

Accordingly, the use of the HDI isocyanurate group-containing polyisocyanate as a trimer can not lead to a sufficient result, because the SP value thereof is 11.7.

When a specific diol having 2 to 7 carbon atoms is reacted with an aliphatic isocyanurate group-containing polyisocyanate (preferably derived from HDI) in a specific ratio to thereby increase the SP value of the resultant aliphatic polyisocyanate prepolymer to 11.8 or more, the compatibility of the aliphatic polyisocyanate prepolymer with the hydroxyl group-containing polyol can be improved.

Particularly when a specific diol having 2 to 4 carbon atoms (or having a MW of 62 to 90 or a SP value of 14.8 or more) is used in a specific ratio, the compatibility of the resultant prepolymer with the hydroxyl group-containing polyol can be further improved.

Suitable hydroxyl group-containing polyols for use in coating compositions of the present invention include polyhydroxy compounds having at least 2 hydroxyl groups in the molecule and a hydroxyl group content of 5.0% by weight or more, based on the weight of the polyhydroxy compound. Preferably, the hydroxyl group content in the polyol is 7.0% by weight or more, more preferably 7.5% by weight or more. The upper limit of the hydroxyl group content is generally 10% by weight.

Examples of suitable polyhydroxy compounds include aliphatic hydrocarbon polyols, polyether polyols, polyester polyols, acrylic polyols, epoxypolyols, polycarbonate polyols, and urethane polyols. Each of the above-mentioned polyhydroxy compounds may be used alone or in combination with at least one selected from the above as a mixture so that the hydroxyl group content is 5.0% by weight or more. Among these polyhydroxy compounds, polyester polyols and acrylic polyols which are excellent in weather resistance are preferred. The use of a polyhydroxy compound which has a hydroxyl group content of less than 5.0% by weight is unable to provide a polyurethane resin coating composition which contains a sufficient amount of urethane bonds, so that such a coating composition can not have sufficient coating characteristics.

As the aliphatic hydrocarbon polyol, for example, a hydroxyl group-terminated polybutadiene and a hydrogenated product thereof are mentioned.

As the polyether polyols, there are mentioned, for example, polyether polyols obtained by addition polymerization of each of alkylene oxides (e.g., ethylene oxide, and propylene oxide) or a mixture thereof with each of polyhydric alcohols (e.g., glycerin, and propylene glycol) and polyfunctional compounds (e.g., ethylenediamine and ethanolamine) or a mixture thereof; and polymer polyols obtained by polymerizing acryl amide which is formed using polytetramethylene glycol and a polyether polyol thereof as a medium.

As the polyester polyols, there are mentioned, for example, polyester polyol resins obtained by condensation reaction of each dibasic acid selected from carboxylic acids (e.g., succinic acid, adipic acid, sebacic acid, dimer acid, maleic anhydride, fumaric anhydride, isophthalic acid, and terephthalic acid) or a mixture thereof, with each of polyhydric alcohols (e.g., ethylene glycol, propylene glycol, diethylene glycol, neopentyl glycol, trimethylolpropane, and glycerin) or a mixture thereof; polycaprolactone obtained by ring-opening polymerization of ε-caprolactone and polyhydric alcohol; and ester of an aliphatic compound having a hydroxyl group such as caster oil, with polyhydric alcohol.

As the acryl polyols, there are mentioned compounds obtained by copolymerizing polymerizable monomers each having at least one active hydrogen atom in the molecule, with monomers copolymerizable with the above-mentioned monomers. For example, the acryl polyols include acryl polyol resins obtained by polymerizing (i) one monomer or a mixture of at least 2 monomers selected from the group consisting of acrylates each having active hydrogen atom(s), such as 2-hydroxyethyl acrylate, 2-hydroxypropyl acrylate, and 2-hydroxybuthyl acrylate; methacrylates each having active hydrogen atom(s), such as 2-hydroxyethyl methacrylate, 2-hydroxypropyl methacrylate, and 2-hydroxybuthyl methacrylate; and methacrylic acids and acrylic acids each having polyhydric active hydrogen, such as monoacrylate or monomethacrylate of glycerin, and monoacrylate or monomethacrylate of trimethylolpropane, and (ii) one monomer or a mixture of at least 2 monomers selected from the group consisting of methyl acrylate, ethyl acrylate, isopropyl acrylate, n-butyl acrylate, and 2-ethylhexyl acrylate; and methacrylates such as methyl methacrylate, ethyl methacrylate, isopropyl methacrylate, n-butyl methacrylate, isobutyl methacrylate, and 2-hexyl methacrylate, in the presence or absence of (iii) one monomer or a mixture of at least 2 monomers selected from the group consisting of unsaturated carboxylic acids such as acrylic acid, methacrylic acid and itaconic acid; unsaturated amides such as acrylamide and N-methylol acrylamide; and polymerizable monomers such as styrene, vinyl toluene, vinyl acetate and acrylonitrile.

As the epoxy polyols, there can be mentioned novolaks, β-methylepichlorohydrins, cyclic oxiranes, glycidyl ethers, glycidyl esters, glycol ethers, epoxydized aliphatic unsaturated compounds, epoxydized aliphatic esters, polyvalent carboxylates, aminoglycidyls, and resorcins.

As the polycarbonate polyols, there are mentioned polycarbonate polyols obtained from aromatic polyhydric alcohols such as bisphenol A, or aliphatic or alicyclic polyhydric alcohols such as 1,6-hexane diol as raw materials.

As the urethane polyols, there are mentioned polymers each having an urethane bond therein and a hydroxyl group at its side chain or end, which are produced by polyaddition reaction of aromatic, aliphatic or alicyclic diisocyanates with active hydrogen-containing compounds.

As other components of the coating composition, there can be used the following pigments, additives, solvents, etc. which are commonly used in this technical field. Examples of the pigments include organic pigments such as quinacridones, azos or phthalocyanines; inorganic pigments such as titanium oxide, barium sulfate, calcium carbonate, and silica; carbon type pigments; metal foil pigments; and rust proof pigments. Examples of the additives include hindered amines, benzotriazoles and benzophenones UV absorbents; hindered phenols, phosphorus, sulfur and hydrazide-based antioxidants; tin based, zinc based and amine based urethanizing catalysts; leveling agents; rheology controlling agents; and pigment dispersants.

When the coating composition is prepared, if needed, an appropriate solvent may be selected for use from the group including hydrocarbons (e.g., cyclohexane, mineral spirit, and naphtha), ketones (e.g., acetone, methyl ethyl ketone and methyl isobutyl ketone), and esters (e.g., ethyl acetate, n-butyl acetate, isobutyl acetate, cellosolve acetate, and propyleneglycol monomethylether acetate) in accordance with an end use. Each of these solvents may be used alone or in combination of at least two. Preferably used as the solvent are esters such as ethyl acetate, n-butyl acetate, isobutyl acetate, cellosolve acetate and propyleneglycol monomethylether acetate, and ketones such as methyl ethyl ketone and methyl isobutyl ketone. The use of aromatic hydrocarbons such as toluene and xylene as the solvent is undesirable in view of sick building syndrome and the like.

The equivalent ratio of the isocyanate group in the hardener (i.e., the aliphatic polyisocyanate prepolymer to the hydroxyl group in the polyol, in the two-component polyurethane resin coating, can be determined in accordance with the required properties of the resultant coating layer. Generally, this equivalent ratio is selected within a range of 0.8 to 1.8.

As has been described above, the aliphatic polyisocyanate prepolymer of the present invention is preferably obtained by reacting the short-chain diol with the aliphatic isocyanurate group-containing polyisocyanate. As the diol, a diol having 2 to 7 carbon atoms is preferable, and particularly, a diol having 2 to 4 carbon atoms and a molecular weight of 100 or less is preferred.

Preferably, the aliphatic polyisocyanate prepolymer contains 3.0% by weight or more of the urethane bond, based on the weight of the aliphatic polyisocyanate prepolymer, and has a solubility parameter of 11.8 or more. Preferably, the isocyanate group content is 16.5% by weight or more.

Preferably, a two-component polyurethane resin coating composition comprises the aliphatic polyisocyanate prepolymer of the present invention as the hardener, and a hydroxyl group-containing polyol having a hydroxyl group content of 5.0% by weight or more, preferably 7.0% by weight or more, particularly 7.5% by weight or more.

Since the aliphatic polyisocyanate prepolymers of the present invention are highly compatible with the hydroxyl group-containing polyol, the use thereof for a polyurethane resin paint can provide stable and excellent coating characteristics.

In addition, since any aromatic hydrocarbon such as toluene and xylene is not used as a solvent in the aliphatic polyisocyanate composition, the resultant polyurethane resin coating is excellent in working safety and is friendly with the environment in view of anti-VOC, sick building syndrome, etc.

EXAMPLES

Examples of the present invention will be described below, but the present invention is not limited to the following examples. In the Examples, part and % mean part by weight and % by weight, unless otherwise noted. The evaluation methods, etc. are as follows.

Evaluation on Compatibility of Aliphatic Polyisocyanate Composition with Hydroxyl Group-Containing Acrylic Polyol Composition An aliphatic polyisocyanate composition and a hydroxyl group-containing acrylic polyol composition (acrylic polyol for experimental research, manufactured by Bayer Material Science AG, hydroxyl group content in resin of 8.1%, viscosity of 1800 mPa·s at 23° C., nonvolatile content of 70%, solvent: butyl acetate) were compounded so that an equivalent ratio of isocyanate group/hydroxyl group was 1.0.

A coating material was obtained in such manner that a mixture of n-butyl acetate/propyleneglycol monomethylether acetate (weight ratio 50/50) as a thinner was added for solid content in compound (1) (the aliphatic polyisocyanate composition and the hydroxyl group-containing acrylic polyol composition) to be 48% by weight.

(3) Within 2 minutes after stirring the coating material (2), it was spray coated on a steel plate coated/baked with a black two-component type urethane paint, baked in a dry oven maintained at 140° C. for 30 minutes, and taken out to observe the coating state for compatibility by the naked eye at room temperature.

(4) Criteria were set as follows.
○ (Good): Compatibility is good when coating is clear
x (Bad): Compatibility is bad when clouding occurs in coating Evaluation on Thermal Stability (Heat Resistance) of Aliphatic Polyisocyanate Composition (1) A coating material produced in the same manner as in the evaluation of compatibility was spray coated on a steel plate coated/baked with a white two-component type urethane paint, baked in a dry oven maintained at 140° C. for 30 minutes, and taken out to measure b* value at room temperature using a spectral colorimeter (trade name: Color guide TM45/0, product No. 6800, manufactured by BYK-Chemie Japan KK.)

(2) Thereafter, it was baked again in a dry oven maintained at 160° C. for 60 minutes and taken out to measure b* value at room temperature, and Δb* value which is difference from (1) was confirmed.

(3) Criteria were set as follows.
○ (Good): Δb* value is less than 1.0
x (Bad): Δb* value is not less than 1.0

Evaluation on Hardening-1 (Chemical Resistance) of Aliphatic Polyisocyanate Composition A coating material produced in the same manner as in the evaluation of compatibility was spray coated on a steel plate coated/baked with a black two-component type urethane paint, baked in a dry oven maintained at 140° C. for 30 minutes, and allowed to stand at 23° C., in 55 RH % for one week:

Evaluation of chemical resistance was conducted by a method that 50 microliters of 1% sulfuric acid was dropped in spot on each hardened coating, baked at each temperature of 35° C. to 80° C. in a gradient oven maintained in 35° C. to 80° C. (product No. 2611 manufactured by BYK-Chemie Japan KK.) for 30 minutes to observe the coating state by the naked eye.

Criteria were set as follows.
○: Good due to no change of coated surface at 45° C.
Δ: Somewhat bad because drop mark is observed on coated surface in 40 to 44° C.
x: bad because drop mark is observed on coated surface at lower than 40° C.

Evaluation on Hardening-2 (Stain Resistance) of Aliphatic Polyisocyanate Composition A coating material produced in the same manner as in the evaluation of compatibility was spray coated on a steel plate coated/baked with a white two-component type urethane paint, baked in a dry oven maintained at 140° C. for 30 minutes, and allowed to stand at 23° C., in 55 RH % for one week:

After 50 microliters of a red aqueous ink was dropped in spot, it was baked in a dry oven maintained at 60° C. for 15 minutes, then the red aqueous ink was wiped off with waste cloth or absorbent cotton, the residual state of red aqueous ink on the coated surface was observed by the naked eye.

Criteria were as follows:
○ (Good): Red aqueous ink is not left on coated surface
x (Bad): Red aqueous ink is left on coated surface

Example 1

To a four neck flask equipped with a thermometer, stirring blade and reflux condenser, were added under nitrogen stream 100 parts of HDI isocyanurate type polyisocyanate (Sumidur N3300 manufactured by Sumika Bayer Urethane Co., Ltd., content of isocyanate group of 21.8%, viscosity of 3000 mPa·s at 25° C., nonvolatile content of 100%, SP value of 11.7 (calculated value)), 25.8 parts of propyleneglycol monomethylether acetate and 0.53 parts of 0.5% dibutyltin laurate solution dissolved in propyleneglycol monomethylether acetate (0.003 parts as dibutyltin laurate) at room temperature and stirred, followed by raising temperature to 100° C. Thereafter, 3.2 parts of ethylene glycol was added little by little, and reaction was continued for 4 hours.

The resultant HDI polyisocyanate composition was a transparent liquid, the nonvolatile content of which was 80%, the content of isocyanate group was 13.6% (17.0% as the content of isocyanate group in resin from consideration of 20% of volatile content), and the content of urethane bond in the HDI polyisocyanate composition is 5.8% (calculated value), and the SP value was 12.1 (calculated value).

This HDI polyisocyanate composition and an acrylic polyol composition having the content of hydroxyl group in resin of 8.1% as main resins were compounded so that equivalent ratio of isocyanate group/hydroxyl group was 1.0, a mixture of n-butyl acetate/propyleneglycol monomethylether acetate (weight ratio of 50/50) as thinner was added thereto to give a coating material having a total resin content of 48%.

Within 2 minutes after stirring the coating material, it was spray coated for dry film thickness to be 30-40 micrometers on steel plates coated/baked with a white two-component type urethane paint and a black two-component type urethane paint, backed in a dry oven maintained at 140° C. for 30 minutes, taken out, then visual evaluation on appearance of the coating was conducted at room temperature.

The coating was transparent, and the compatibility of the HDI polyisocyanate composition and hydroxyl group-containing acrylic polyol composition was excellent. Also, the coating was evaluated using a part thereof for chemical resistance, heat resistance and stain resistance. These results were all excellent as shown in Table 1.

Example 2

A HDI polyisocyanate composition was obtained in the same manner as in Example 1 except that ethylene glycol (diol) was changed to 3.8 parts of propylene glycol, and the amount of propyleneglycol monomethylether acetate was changed to 25.9 parts.

The resultant HDI polyisocyanate composition was a transparent liquid, the nonvolatile content of which was 80%, the content of isocyanate group was 13.6% (17.0% as the content of isocyanate group in resin from consideration of 20% of volatile content), and the content of urethane bond in the HDI polyisocyanate composition was 5.6% (calculated value), and the SP value was 12.1 (calculated value).

A coating material was produced in the same manner as in Example 1 using this HDI polyisocyanate composition to conduct the evaluation of coating. The coating was transparent even after being baked in a dry oven maintained at 140° C. for 30 minutes, the compatibility of the HDI polyisocyanate composition and hydroxyl group-containing acrylic polyol composition was excellent. Also, chemical resistance, heat resistance and stain resistance evaluations were all excellent as shown in Table 1.

Example 3

A HDI polyisocyanate composition was obtained in the same manner as in Example 1 except that ethylene glycol (diol) was changed to 4.4 parts of 1,4-butanediol, and the amount of propyleneglycol monomethylether acetate was changed to 26.1 parts.

The resultant HDI polyisocyanate composition was a transparent liquid, the nonvolatile content of which was 80%, the content of isocyanate group was 13.6% (17.0% as the content of isocyanate group in resin from consideration of 20% of volatile content), and the content of urethane bond in the HDI polyisocyanate composition was 5.5% (calculated value), and the SP value was 12.0 (calculated value).

A coating material was produced in the same manner as in Example 1 using this HDI polyisocyanate composition to conduct the evaluation of coating. The coating was transparent even after being baked in a dry oven maintained at 140° C. for 30 minutes, the compatibility of the HDI polyisocyanate composition and hydroxyl group-containing acrylic polyol composition was excellent. Also, chemical resistance, heat resistance and stain resistance evaluations were all excellent as shown in Table 1.

A HDI polyisocyanate composition was obtained in the same manner as in Example 1 except that ethylene glycol (diol) was changed to 5.4 parts of 1,6-hexanediol, and the amount of propyleneglycol monomethylether acetate was changed to 26.5 parts.

The resultant HDI polyisocyanate composition was a transparent liquid, the nonvolatile content of which was 80%, the content of isocyanate group was 13.6% (17.0% as the content of isocyanate group in resin from consideration of 20% of volatile content), and the content of urethane bond in the HDI polyisocyanate composition was 5.2% (calculated value), and the SP value was 11.9 (calculated value).

A coating material was produced in the same manner as in Example 1 using this HDI polyisocyanate composition to conduct the evaluation of coating. The coating was transparent even after being baked in a dry oven maintained at 140° C. for 30 minutes, the compatibility of the HDI polyisocyanate composition and hydroxyl group-containing acrylic polyol composition was excellent. Also, chemical resistance, heat resistance and stain resistance evaluations were all excellent as shown in Table 1.

Example 5

A HDI polyisocyanate composition was obtained in the same manner as in Example 1 except that ethylene glycol (diol) was changed to 5.9 parts of 2-ethyl-2,4-pentanediol, and the amount of propyleneglycol monomethylether acetate was changed to 26.4 parts.

The resultant HDI polyisocyanate composition was a transparent liquid, the nonvolatile content of which was 80%, the content of isocyanate group was 13.6% (17.0% as the content of isocyanate group in resin from consideration of 20% of volatile content), and the content of urethane bond in the HDI polyisocyanate composition was 5.0% (calculated value), and the SP value was 11.9 (calculated value).

A coating material was produced in the same manner as in Example 1 using this HDI polyisocyanate composition to conduct the evaluation of coating. The coating was transparent even after being baked in a dry oven maintained at 140° C. for 30 minutes, the compatibility of the HDI polyisocyanate composition and hydroxyl group-containing acrylic polyol composition was excellent. Also, chemical resistance, heat resistance and stain resistance evaluations were all excellent as shown in Table 1.

Comparative Example 1

By using only HDI isocyanurate type polyisocyanate (Sumidur N3300 manufactured by Sumika Bayer Urethane Co., Ltd., content of isocyanate group of 21.8%, viscosity of 3000 mPa·s at 25° C., nonvolatile content of 100%, SP value of 11.7 (calculated value)), a coating material was produced in the same manner as in Example 1 to conduct the evaluation of coating.

The coating after being baked in a dry oven maintained at 140° C. for 30 minutes had clouding, the compatibility of the HDI isocyanurate type polyisocyanate and hydroxyl group-containing acrylic polyol composition was bad. Also, since the coating had clouding and underwent appearance deterioration, no evaluation of chemical resistance, heat resistance and stain resistance was conducted.

Comparative Example 2

A HDI polyisocyanate composition was obtained in the same manner as in Example 1 except that ethylene glycol (diol) was changed to 3.4 parts of 2-ethyl-2,4-pentanediol.

The resultant aliphatic polyisocyanate composition was a transparent liquid, the nonvolatile content of which was 80%, the content of isocyanate group was 15.2% (19.0% as the content of isocyanate group in resin from consideration of 20% of volatile content), and the content of urethane bond in the HDI polyisocyanate composition is 2.9% (calculated value), and the SP value was 11.9 (calculated value).

The urethane bond content of HDI polyisocyanate composition was 5.3% (calculated value).

A coating material was produced in the same manner as in Example 1 using this HDI isocyanate composition to conduct the evaluation of coating.

The coating after being baked in a dry oven maintained at 140° C. for 30 minutes had clouding; the compatibility of the HDI polyisocyanate composition and hydroxyl group-containing acrylic polyol composition was bad. Also, since the coating had clouding and underwent appearance deterioration, no evaluation of chemical resistance, heat resistance and stain resistance was conducted.

Comparative Example 3

A HDI polyisocyanate composition was obtained in the same manner as in Example 1 except that ethylene glycol (diol) was changed to 6.9 parts of 2-butyl-2-ethyl-1,3-propanediol, and the amount of propyleneglycol monomethylether acetate was changed to 26.7 parts.

The resultant aliphatic polyisocyanate composition was a transparent liquid, the nonvolatile content of which was 80%, the content of isocyanate group was 13.6% (17.0% as the content of isocyanate group in resin from consideration of 20% of volatile content), the content of urethane bond in the HDI polyisocyanate composition was 4.8% (calculated value), and the SP value was 11.7 (calculated value).

A coating material was produced in the same manner as in Example 1 using this HDI isocyanate to conduct the evaluation of coating.

The coating after being baked in a dry oven maintained at 140° C. for 30 minutes had clouding, the compatibility of the HDI polyisocyanate composition and hydroxyl group-containing acrylic polyol composition was bad. Also, since the coating had clouding and underwent appearance deterioration, no evaluation of chemical resistance, heat resistance and stain resistance was conducted.

Comparative Example 4

By using only HDI-TMP adduct type polyisocyanate (Sumidur HT manufactured by Sumika Bayer Urethane Co., Ltd., content of isocyanate group of 13.0%, viscosity of 260 mPa·s at 25° C., nonvolatile content of 75%, solvent: butyl acetate, SP value of 12.0 (calculated value)), a coating material was produced in the same manner as in Example 1 to conduct the evaluation of coating.

The coating was transparent after being baked in a dry oven maintained at 140° C. for 30 minutes, the compatibility of the HDI-TMP adduct type polyisocyanate composition and hydroxyl group-containing acrylic polyol composition was excellent, the heat resistance was also good, but the chemical resistance was bad because drop mark at lower than 40° C. was observed. Also, the evaluation of stain resistance was bad because ink remained on the coated surface.

Comparative Example 5

By using only HDI biuret type polyisocyanate (Desmodur N3200 manufactured by Bayer Material Science AG, content of isocyanate group of 23.0%, viscosity of 1800 mPa·s at 23° C., nonvolatile content of 100%, SP value of 12.0 (calculated value)), a coating material was produced in the same manner as in Example 1 to conduct the evaluation of coating.

The coating was transparent after being baked in a dry oven maintained at 140° C. for 30 minutes, the compatibility of the HDI biuret type polyisocyanate and hydroxyl group-containing acrylic polyol composition was excellent. The chemical resistance was bad because drop mark was observed in 40 to 44° C., the heat resistance was bad because of 1.3 in Δb* value, and the evaluation of stain resistance was also bad because ink remained on the coated surface.

Comparative Example 6

A HDI polyisocyanate composition was produced in the same manner as in Example 1 except that 100 parts of HDI-TMP adduct type polyisocyanate composition used in Comparative example 4, 9.5 parts of propyleneglycol monomethylether acetate, 0.40 parts of 0.5% dibutyltin laurate solution dissolved in propyleneglycol monomethylether acetate (0.002 parts as dibutyltin laurate), and 5.5 parts of 1,6-hexanediol as diol were employed.

The resultant aliphatic polyisocyanate composition was a transparent liquid, the nonvolatile content of which was 70%, the content of isocyanate group was 7.9% (11.3% as the content of isocyanate group in resin from consideration of 30% of volatile content), the content of urethane bond in the HDI polyisocyanate composition obtained from HDI-TMP adduct type polyisocyanate composition and 1,6-hexanediol was 33.0% (calculated value), and the SP value was 12.2 (calculated value).

A coating material was produced in the same manner as in Example 1 by using this HDI polyisocyanate composition to conduct the evaluation of coating. The coating was transparent after being baked in a dry oven maintained at 140° C. for 30 minutes, the compatibility of the HDI type polyisocyanate composition and hydroxyl group-containing acrylic polyol composition was excellent.

Evaluations of chemical resistance, heat resistance and stain resistance were conducted to find that although the heat resistance was good, the chemical resistance was bad because drop mark was observed at lower than 40° C. Also, the evaluation of stain resistance was bad because ink remained on the coated surface.

Comparative Example 7

Evaluations were conducted in the same manner as in Example 1 except that an acrylic polyol compound with the content of hydroxyl group in resin of 4.3% (Desmophen A 870 BA manufactured by Bayer Material Science AG, content of hydroxyl group of 3.0%, viscosity of 3500 mPa·s at 23° C., nonvolatile content of 70%, solvent: butyl acetate) was used.

The coating was transparent after being baked in a dry oven maintained at 140° C. for 30 minutes, the compatibility of the HDI polyisocyanate composition and acrylic polyol composition with the content of hydroxyl group in resin of 4.3% was excellent. The chemical resistance and heat resistance were good, but the evaluation of stain resistance was bad because ink remained on the coated surface.

TABLE 1

| Part is part by weight | Example 1 | Example 2 | Example 3 | Example 4 | Example 5 | Comparative example 1 | Comparative example 2 |
|---|---|---|---|---|---|---|---|
| Aliphatic polyisocyanate (part) | | | | | | | |
| isocyanurate type polyisocyanate | 100 | 100 | 100 | 100 | 100 | 100 | 100 |
| TMP adduct type polyisocyanate | | | | | | | |
| biuret type polyisocyanate | | | | | | | |
| Short-chain diol (part) | | | | | | | |
| ethylene glycol | 3.2 | | | | | | |
| propylene glycol | | 3.8 | | | | | |
| 1,4-butanediol | | | 4.4 | | | | |
| 1,6-hexanediol | | | | 5.4 | | | |
| 2-ethyl-2,4-pentanediol | | | | | 5.9 | | 3.4 |
| 2-butyl-2-ethyl-1,3-propanediol | | | | | | | |
| 0.5% dibutyltin laurate solution (part) | 0.53 | 0.53 | 0.53 | 0.53 | 0.53 | | 0.53 |
| Solvent component (part) | | | | | | | |
| propyleneglycol monomethylether acetate | 25.8 | 25.9 | 26.1 | 26.4 | 26.5 | | 25.8 |
| Content of urethane bond in aliphatic polyisocyanate composition (%) | 5.8 | 5.6 | 5.5 | 5.2 | 5.0 | 0.0 | 2.9 |
| SP value of aliphatic polyisocyanate composition | 12.1 | 12.1 | 12.0 | 11.9 | 11.9 | 11.7 | 11.9 |
| Content of hydroxyl group in resin of polyol composition as main resin (%) | 8.1 | 8.1 | 8.1 | 8.1 | 8.1 | 8.1 | 8.1 |
| Two-component type coating composition | | | | | | | |
| (1) Compatibility | ○ | ○ | ○ | ○ | ○ | x | x |
| (2) Heat resistance | ○ | ○ | ○ | ○ | ○ | — | — |
| (3) Chemical resistance | ○ | ○ | ○ | ○ | ○ | — | — |
| (4) Stain resistance | ○ | ○ | ○ | ○ | ○ | — | — |

| Part is part by weight | Comparative example 3 | Comparative example 4 | Comparative example 5 | Comparative example 6 | Comparative example 7 |
|---|---|---|---|---|---|
| Aliphatic polyisocyanate (part) | | | | | |
| isocyanurate type polyisocyanate | 100 | | | | 100 |
| TMP adduct type polyisocyanate | | 100 | | 100 | |
| biuret type polyisocyanate | | | 100 | | |
| Short-chain diol (part) | | | | | |
| ethylene glycol | | | | | |
| propylene glycol | | | | | |
| 1,4-butanediol | | | | | |
| 1,6-hexanediol | | | | 5.5 | 5.4 |
| 2-ethyl-2,4-pentanediol | | | | | |
| 2-butyl-2-ethyl-1,3-propanediol | 6.9 | | | | |
| 0.5% dibutyltin laurate solution (part) | 0.53 | | | 0.40 | 0.53 |
| Solvent component (part) | | | | | |
| propyleneglycol monomethylether acetate | 26.7 | | | 9.5 | 26.4 |
| Content of urethane bond in aliphatic polyisocyanate composition (%) | 4.8 | 27.0 | 0.0 | 33.0 | 5.2 |
| SP value of aliphatic polyisocyanate composition | 11.7 | 12.0 | 12.0 | 12.2 | 11.9 |
| Content of hydroxyl group in resin of polyol composition as main resin (%) | 8.1 | 8.1 | 8.1 | 8.1 | 4.3 |
| Two-component type coating composition | | | | | |
| (1) Compatibility | x | ○ | ○ | ○ | ○ |
| (2) Heat resistance | — | ○ | x | ○ | ○ |
| (3) Chemical resistance | — | x | Δ | x | ○ |
| (4) Stain resistance | — | x | x | x | x |

Since the aliphatic polyisocyanate prepolymers of the present invention have excellent compatibility with the hydroxyl group-containing polyols, the combination of the aliphatic polyisocyanate prepolymers and the hydroxyl group-containing polyols can give a two-component polyurethane resin paint having excellent coating characteristics. It is useful as a paint for repairing automobile, an automobile top coating paint, a plastic part for automobile, and a paint for home electronics and the like, which require excellent characteristics of a coating film.

Although the invention has been described in detail in the foregoing for the purpose of illustration, it is to be understood that such detail is solely for that purpose and that variations can be made therein by those skilled in the art without departing from the spirit and scope of the invention except as it may be limited by the Claims.

What is claimed is:

1. A polyurethane resin coating composition comprising
   (a) an aliphatic polyisocyanate prepolymer
      comprising the reaction product of an aliphatic isocyanurate group-containing polyisocyanate and a short-chain diol, having a urethane bond content of 4.5% by weight or more, based on the weight of the prepolymer, and a solubility parameter of 11.8 or more and wherein the short-chain diol is a diol having 2 to 7 carbon atoms
   and
   (b) a hydroxyl group-containing polyol having a hydroxyl group content of 5.0% by weight or more, based on the weight of the polyol.

2. The composition of claim 1, wherein the aliphatic isocyanurate group-containing isocyanate is prepared from an aliphatic diisocyanate.

3. The composition of claim 2, wherein the aliphatic diisocyanate is 1,6-hexamethylene diisocyanate.

4. The composition of claim 1, wherein the short-chain diol has a carbon atom number of 2 to 4.

5. The composition of claim 1, wherein the content of isocyanate group in the prepolymer is at least 16.5% by weight.

6. The composition as claimed in claim 1, wherein the diol is ethylene glycol, propylene glycol, 1,2-propanediol, 1,3-propanediol, 1,4-butanediol, 1,3-butanediol, 1,2-butanediol, 1,5-pentanediol, 1,6-hexanediol, methylpentanediol, diethylene glycol or triethylene glycol.

7. The composition as claimed in claim 1, wherein the diol contains 3 or 4 carbon atoms, and has a molecular weight up to 90.

8. The composition as claimed in claim 7, wherein the solubility parameter of the diol is from 14.8 to 17.8.

9. The composition of claim 8, wherein the content of isocyanate group in the prepolymer is at least 16.5% by weight.

10. The composition of claim 9, wherein the aliphatic diisocyanate is 1,6-hexamethylene diisocyanate.

11. The composition as claimed in claim 1, wherein the solubility parameter of the diol is 14.8 or more.

12. The composition as claimed in claim 1, wherein the solubility parameter of the diol is from 14.8 to 17.8.

13. The composition as claimed in claim 1, wherein the reaction product of an aliphatic isocyanurate group-containing polyisocyanate and a short-chain diol, has a urethane bond content of 5% by weight or more, based on the weight of the prepolymer.

14. The composition as claimed in claim 13, wherein the hydroxyl group-containing polyol has a hydroxyl group content in the range of 7.5% by weight to 10% by weight based on the weight of the polyol.

15. The composition as claimed in claim 14, which consists essentially of (a) and (b).

16. The composition as claimed in claim 14, which consists of (a) and (b).

17. The composition as claimed in claim 1, wherein the hydroxyl group-containing polyol has a hydroxyl group content of 7.0% by weight or more, based on the weight of the polyol.

18. The composition as claimed in claim 1, wherein the hydroxyl group-containing polyol has a hydroxyl group content in the range of 7.5% by weight to 10% by weight based on the weight of the polyol.

19. The composition as claimed in claim 1, which consists essentially of (a) and (b).

20. The composition as claimed in claim 1, which consists of (a) and (b).

* * * * *